Aug. 21, 1934.  M. J. HEINZMANN  1,971,070

CENTRIFUGAL SPRING GOVERNOR

Filed July 26, 1932

Inventor

Max Joseph Heinzmann

Patented Aug. 21, 1934

1,971,070

UNITED STATES PATENT OFFICE 1,971,070

CENTRIFUGAL SPRING GOVERNOR

Max Joseph Heinzmann, Kotzschenbroda, Germany

Application July 26, 1932, Serial No. 624,886

1 Claim. (Cl. 264—15)

In many cases where it is intended to fit a centrifugal spring governor to an engine there is often only available a small hollow cylindrical space between the shaft and the governor casing. This is for instance the case, when the governor is to be fitted to the crank shaft of an engine or to the main through shaft of a turbine which then passes through the governor and, on the other side of the end bearing, drives some kind of machine. This will also be found to be true when the governor is to be fixed to a cam shaft, and especially where the distance between the cam shaft and the engine frame is small.

For the purposes mentioned, the governor construction having weights integral with bell cranks is most suitable. Such a governor may be easily arranged in a small hollow cylindrical space.

The tension springs arranged in two planes symmetrical and parallel to the axial governor line (as hitherto sometimes employed in connection with this governor construction) have the disadvantage that they often bend outward owing to the action of the centrifugal force. Therefore they have to be arranged in large excavations in the weights. This is especially inconvenient in cases of low speeds, where the weights must be made as compact as possible in order to obtain great regulating power. Furthermore, tension springs are more difficult to adjust than compression springs.

It has hitherto not been possible to employ radially arranged compression springs in connection with weights integral with bell cranks because the compression springs, being in direct contact with weights, were likely to bend outward, thus being subject to dangerous breaking strain. The present invention makes it possible to employ radially arranged compression springs by causing the springs to exert pressure not actually on the weights themselves, but on discs or suitable flat supports 16 movably fitted to the weights. Owing to this arrangement, the springs are not subjected to any dangerous breaking strain.

Referring to the accompanying drawing.

Figure 3:
Fig. 3 is a plan of one of the spring supports 12.
Figure 4:
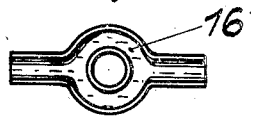
Fig. 4 is a side view of one of the spring supports 12.

The governor support 1 is firmly fixed to the shaft 2 by means of a key 3 and taper pin 4. Pivotally connected to the governor support are arms 5 and 6 integral with weights 7 and mounted on pins 8 fixed to the governor support 1. The arms 6 engage with a sleeve 9. Sleeve 9 is not only guided by means of its bore on the shaft 2, but also by means of claws 10 sliding in grooves 11 of the governor support 1. Sleeve 9 is provided with a circular groove 12 engaging with a fork-shaped guide-piece (not shown). Compression springs 13 oppose the centrifugal force of the weights. They are, with their outer ends, in connection with caps 14 screwed on to central screws 15 firmly connected with the governor support 1. These compression springs exert with their inner ends pressure on flat supports 16 movably seated in the weights. The exact shape of these flat supports 16, which are composed of a flat disc and two journals, is shown by Figs. 3 and 4.

Figure 1:
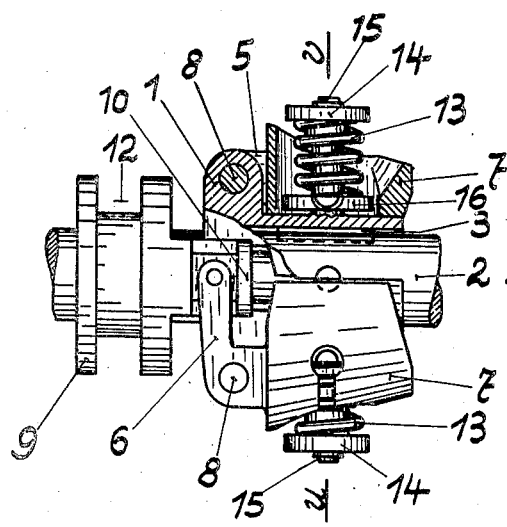
Fig. 1 is a view of the governor partly in section showing radially arranged compression springs only, as required for small speeds.
Figure 2:
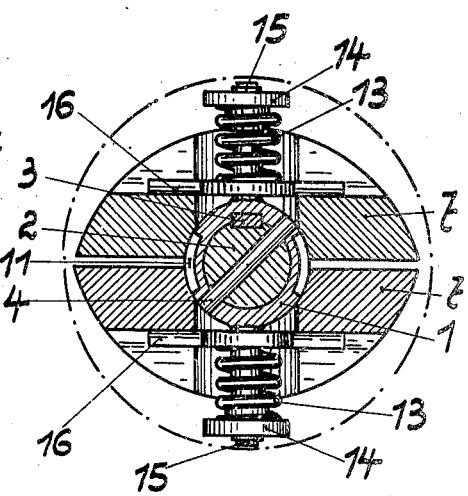
Fig. 2 is a transverse section on a line $u$—$v$ of Fig. 1.

Referring to Figs. 1 and 2, the operation of the governor is as follows:—The governor is directly fitted to the engine shaft 1 or driven from same by means of any suitable intermediate gear or device not shown in the drawing. When the speed exceeds a certain predetermined point, the weights 7 will be forced outward by the centrifugal force, their outward movement being opposed by the action of the springs 13. The movement of weights 7 is transmitted to the sleeve 9 by the arms 6 integral with weights 7. The circular groove 12 engages with a nonrotating fork-shaped guide-piece (not shown) which is moved by the sleeve 9 in axial direction according to the increase or decrease of the speed. This fork-shaped guide-piece engages with a regulating lever (not shown) which is in connection with the distributing gear of the engine. The regulating levers and rods are arranged in such a way that the governor acts on the distributing gear in a closing sense when the speed increases, but in an opening sense when the speed decreases.

The tension springs arranged on two planes parallel to the axial governor line and the excavations hitherto necessary in weights integral with bell cranks are no longer necessary as will be seen from Figs. 1 and 2. The former have been replaced by compression springs 13 (Figs. 1 and 2). Excavations are superfluous, and the regulating power is considerably greater.

I claim:

A governor including two weights, pressure springs adapted to oppose outward movement of said weights under the influence of centrifugal force, spring supports of disc shape having two journals, said spring supports being movably seated in said weights and in contact with said pressure springs.

MAX JOSEPH HEINZMANN.